Patented Aug. 7, 1934

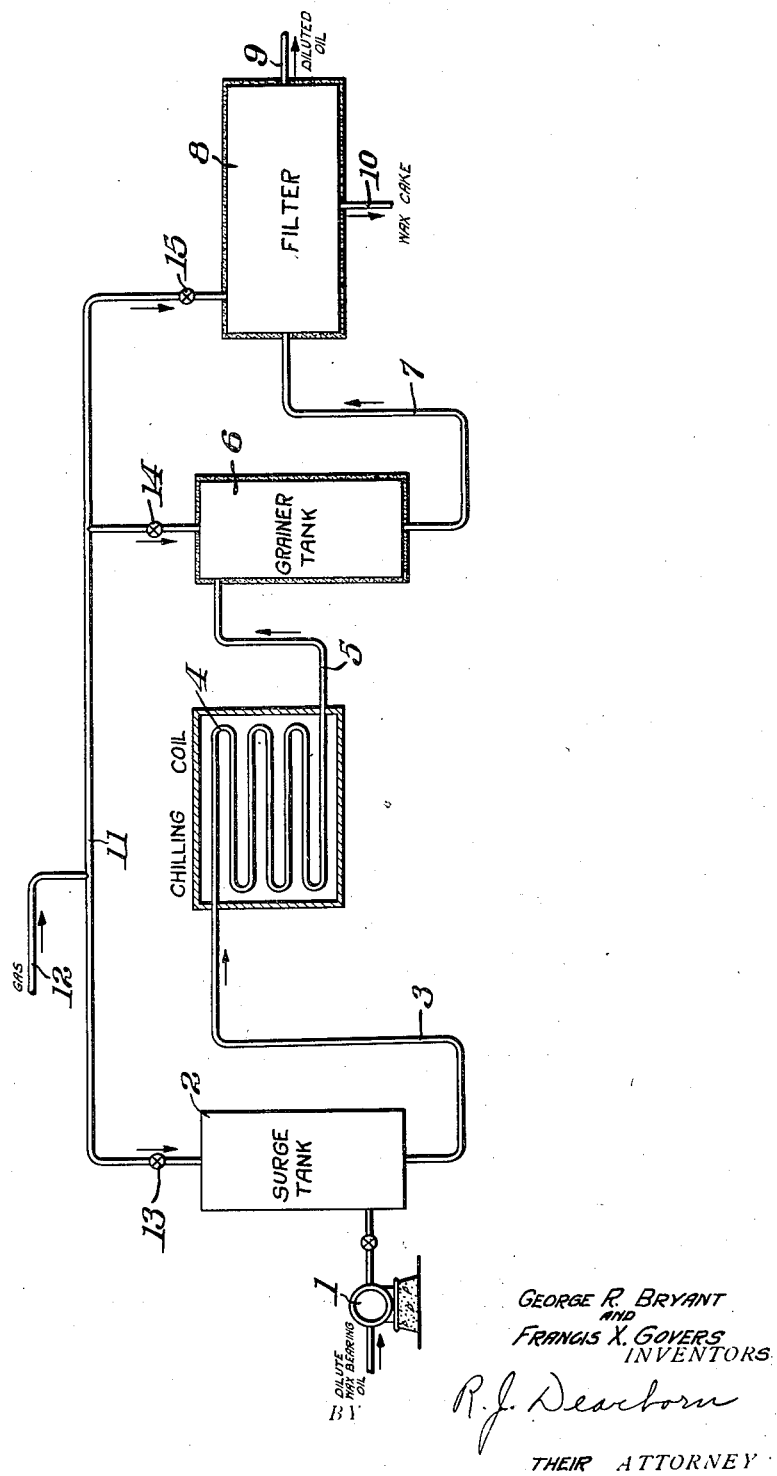

1,969,201

UNITED STATES PATENT OFFICE

1,969,201

REMOVAL OF WAX FROM HYDROCARBON OILS

George R. Bryant, Lawrenceville, Ill., and Francis X. Govers, Vincennes, Ind., assignors to Indian Refining Company, Lawrenceville, Ill., a corporation of Maine Application March 17, 1932, Serial No. 599,588

3 Claims. (Cl. 196—18)

This invention relates to the removal of wax from hydrocarbon oil and more particularly to an improved method of removing paraffin from petroleum hydrocarbons by filtration.

The invention contemplates a process of separating wax constituents from hydrocarbon oil wherein the oil, after mixing with a solvent liquid, is subjected to cooling to precipitate the wax constituents in solid form. The chilled mixture containing the precitated solid hydrocarbons in substantially crystalline form is then delivered to filtering means by fluid pressure displacement without subjecting it to turbulent conditions which would break down or deform the original crystal structure of the precipitated wax.

An object of the invention is to effect precipitation of the wax from the oil in the form of a suspended mass of wax of substantially well defined crystal structure and then to deliver the mixture of liquid and suspended wax to filtering means in a manner such as to avoid disrupting or breaking down this original crystal structure prior to and during subsequent filtration, thus materially facilitating the separation of the precipitated wax from the oil. As ordinarily practiced in the art, the delivery of a chilled mixture of wax distillate and solvent to the filtering medium by mechanical means applied subsequently to the chilling and crystallization, results in subjecting the wax crystals not only to a breaking up of their crystal structure but, by reason of frictional heat generated, causes partial redissolving of the wax in the liquid.

We have discovered that it is highly desirable to avoid subjecting the cool mixture of liquid and precipitated solid hydrocarbons to mechanical pumping during delivery to the filtering means since this has the effect of imparting frictional heat to the cooled mixture, thereby warming it to a sufficient extent to cause re-solution of appreciable amounts of the wax. Mechanical pumping, in many instances, also imparts a pulsating pressure effect upon the filtering mixture which causes intermittent packing of the filter cake and greatly hinders filtration.

We have found that the violent agitation or turbulence to which the oil and suspended wax crystals are subjected by such pumping means during charging to a filter results in breaking up the crystal structure of the suspended wax to such an extent as to greatly reduce the filtering rates which might otherwise be obtained, as well as greatly inhibit satisfactory and effective removal of the wax from oil. Subjection of the crystal mass of wax to turbulence or stirring during the pumping causes disintegration of the crystal structure, resulting in the crystals being reduced from a definite crystal formation, which is readily filterable, to a mass of wax conglomerate substantially lacking in individual crystal structure or particle form and which is very difficultly filterable.

We have discovered that by maintaining the crystal structure of the precipitated wax intact during delivery to the filtering means, the resulting filtering rate may be increased as much as seven or eight times over that obtained when charging the mixture to a filter press in the ordinary manner by direct mechanical pumping. This is particularly true in the solvent type of dewaxing operation such as described in U. S. Patent No. 1,802,942, issued to F. X. Govers, co-inventor of the present invention.

As described in the above patent, the wax-bearing oil is mixed with a selective solvent and after chilling to precipitate the wax, the mixture is subjected to filtering to remove the wax.

By selective solvent we mean a liquid which at temperatures of approximately 100° F. has substantially complete solvent action on a mineral oil wax distillate substantially free from constituents having a boiling point equal to or below that of gas oil and at temperatures of —5° F. and below, has substantially complete solvent action on the liquid hydrocarbons therein but substantially no solvent action on the solid hydrocarbons therein and of such a nature that upon cooling a solution of such mineral oil wax distillate in the solvent liquid to 0° F. and removing the solid hydrocarbons so precipitated and the solvent liquid the resulting oil has a cold test of substantially 0° F.

For example, in carrying out our invention for the production of a low pour test lubricating oil, a wax distillate having a viscosity of 54 Saybolt Universal seconds at 210° F. is mixed with 2½ times its volume of a solvent mixture composed of 65% benzol and 35% acetone. The mixture is then passed through suitable chilling coils wherein it is cooled to —16° F. The cooled mixture is advantageously discharged from the chilling coils into grainer tanks maintained in a cold condition to facilitate growth of individual wax crystals.

The chilling coils, grainer tanks and filtering means are advantageously directly connected to form a closed system so that sufficient pressure may be imposed on the liquid mixture at the inlet to the chilling coils in order to displace the mixture through the chilling coils, grainer tanks and filter press.

In order to more clearly describe the process of the invention, reference will be made to the accompanying drawing.

Wax-bearing oil from a source not shown is delivered by pump 1 to a closed surge tank 2 capable of withstanding pressures above atmospheric. Due to the pressure prevailing within this tank, the wax-bearing oil mixture is forced through a pipe 3 to a chilling coil 4 wherein it is cooled to a temperature of around 0-10° F.

The chilled mixture leaves the chilling coil through the pipe 5 through which it is conducted to the top of a closed grainer tank 6, which is also capable of withstanding substantial pressures.

Compressed gas is introduced to the grainer tank 6 to force the cold mixture out of the bottom of the grainer tank 6 through a pipe 7 to a filter 8 wherein it is subjected to filtration. The filtrate of dewaxed oil is removed through a pipe 9 to storage while the wax removed from the oil as filter cake is discharged from the filter through pipe 10.

The surge tank 2 and the grainer tank 6 each communicate with a manifold 11 to which compressed inert gas is supplied through a pipe 12 from a source not shown.

The mixture of oil and solvent liquid can be charged to the chilling means either mechanically or from the surge tank 2 under the influence of the gaseous displacing medium introduced through the valve 13. Inert gas is introduced under pressure directly to the top of the grainer tank 6 through the valve 14 to displace its contents into the filtering means under a desired pressure while avoiding exposure of the mixture and its suspended wax crystals to agitation. The connections provided between the grainer tanks and filtering means are preferably of sufficient capacity to prevent subjecting the fluid flowing therethrough to turbulence which might otherwise result in breaking down the crystal structure of the wax.

The liquid mixture, while still cold and containing the suspended wax, is introduced to pressure filter 8 advantageously of the rotating leaf type wherein it is subjected to filtration at a pressure of around 40 pounds or more to remove the precipitated wax in the form of a filter cake.

The solvent liquid is recovered for further use by evaporation from the resulting filtrate, leaving a lubricating oil product having a pour test of around —10° F.

While the use of acetone and benzol as a wax-precipitating liquid medium has been described in the above example, it is contemplated that various other solvent liquids or mixtures of such liquids possessing somewhat similar selective properties may equally well be employed. In addition, it is contemplated that the invention is applicable to various types of wax-containing oil and may embrace either distillate or residual oils.

Obviously many modifications and variations of the invention, as hereinbefore set forth, may be made without departing from the spirit and scope thereof, and therefore only such limitations should be imposed as are indicated in the appended claims.

We claim:

1. In the process of manufacturing low cold test lubricating oil which comprises chilling a mixture of wax-bearing mineral oil, which is substantially free from constituents having a boiling point equal to or below that of gas oil, and a selective solvent liquid, having the essential selective solvent properties of a mixture of acetone and benzol as between solid and liquid constituents of the oil, to around 0° F. in a chilling zone to effect crystallization of the wax in a readily filterable form, and then dewaxing the chilled mixture in a filtering zone maintained at a pressure of around forty pounds gauge, the step comprising displacing the chilled mixture containing the suspended crystallized wax, and while still maintained in a cold condition, from the chilling zone to the filtering zone entirely by fluid pressure displacement without intermediate mechanical pumping whereby the mixture is delivered thereto in a relatively quiescent condition without disturbing or breaking up the original crystalline structure of the suspended wax.

2. In the process of manufacturing low cold test lubricating oil which comprises chilling a mixture of wax-bearing mineral oil and a selective solvent at temperatures of around 0° F. to precipitate the wax in crystal form adapted for rapid and effective removal by filtration, the procedure comprising passing the mixture of oil and solvent while under substantial pressure through a chilling zone wherein it is cooled to around 0° F. or below, passing the chilled mixture, under the influence of said pressure, and without intermediate pumping, through a zone of wax crystallization wherein crystallization of the wax is completed under substantially quiescent and non-turbulent conditions, and then similarly conducting, without intermediate pumping, the chilled mixture containing precipitated wax to a zone of filtration whereby the mixture is delivered to the filter in a relatively quiescent condition without disrupting the crystalline structure of the wax prior to introduction thereto.

3. In the process of manufacturing low cold test lubricating oil which comprises chilling a mixture of wax-bearing mineral oil and a selective solvent at temperatures of around 0° F. and below to precipitate the wax in crystal form adapted for rapid and effective removal by filtration, the procedure comprising passing the mixture of oil and solvent through a chilling zone wherein the mixture is cooled below 0° F. to crystallize the wax, subjecting the cold mixture containing suspended wax crystals to gaseous pressure sufficient to displace the mixture from said chilling zone to a filtering zone for removal of the wax without intermediate mechanical pumping, but insufficient to destroy the original crystalline structure of the suspended wax, and thus passing the cold wax-bearing mixture to said filtering zone whereby the mixture is delivered thereto in a relatively quiescent condition without disrupting the crystalline structure of the wax prior to introduction thereto.

GEORGE R. BRYANT.
FRANCIS X. GOVERS.